Feb. 10, 1925.
J. G. MOOMY
APPARATUS FOR UNITING TUBES
Filed March 17, 1922
1,525,684
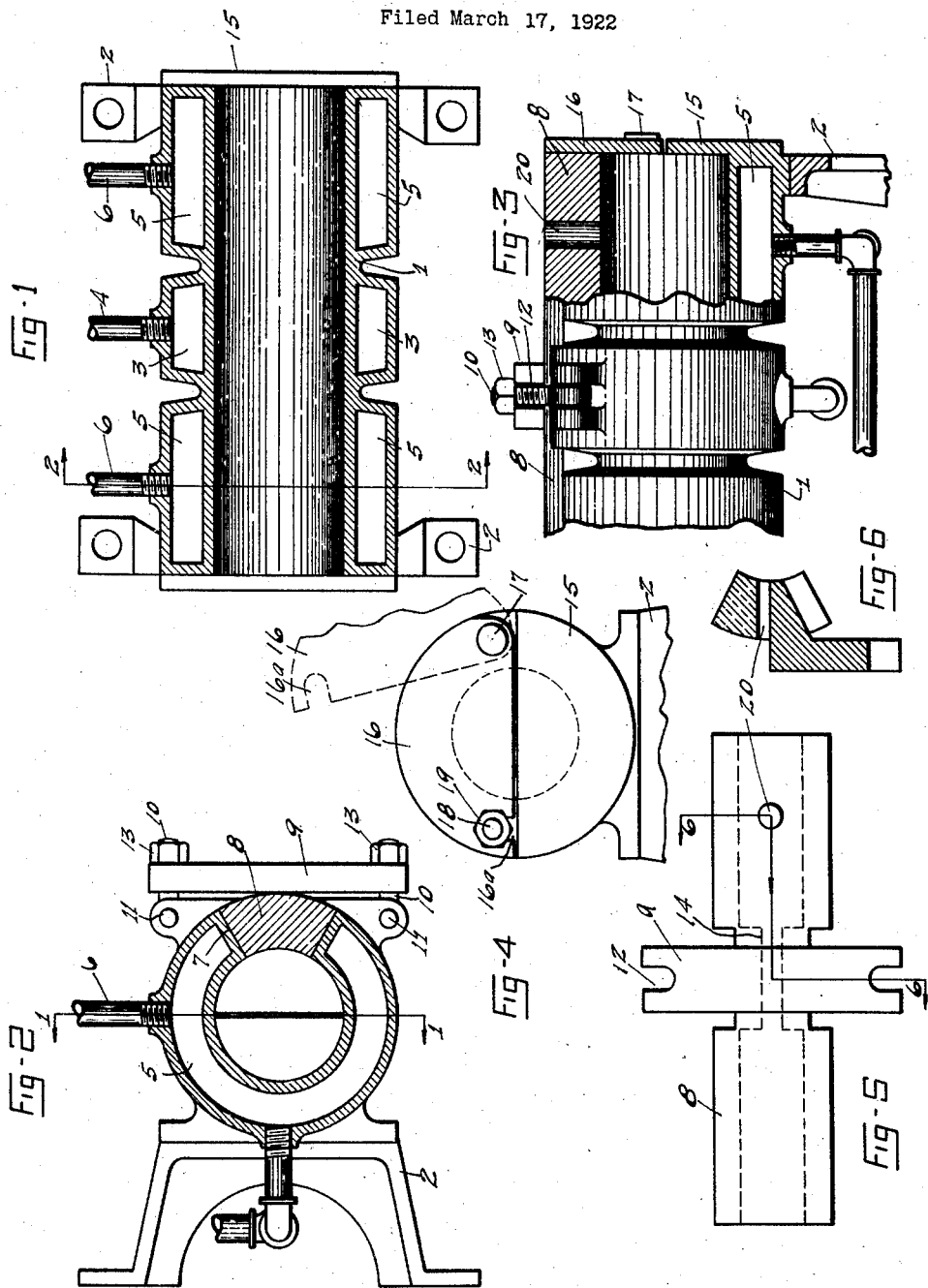
Inventor
Joseph G. Moomy
W. R. Linf
Attorney Patented Feb. 10, 1925.

1,525,684

UNITED STATES PATENT OFFICE.

JOSEPH G. MOOMY, OF ERIE, PENNSYLVANIA, ASSIGNOR TO MARY H. MOOMY, OF ERIE, PENNSYLVANIA.

APPARATUS FOR UNITING TUBES.

Application filed March 17, 1922. Serial No. 544,926.

*To all whom it may concern:*

Be it known that I, JOSEPH G. MOOMY, a citizen of the United States, residing at Erie, in the county of Erie and State of Pennsylvania, have invented new and useful Improvements in Apparatus for Uniting Tubes, of which the following is a specification.

In the manufacture of tubes different methods have been employed; the usual method being to cement the ends together using what is known as "cold cure." Some efforts have been made to vulcanize the ends together by folding the tube adjacent to the end but this method subjects some of the vulcanized rubber of the tube to a second heat and tends to weaken the tube adjacent to the joint and also deforms the tube. With the present invention a perfect joint is made. By vulcanization with heat the joint is formed without folding the tube so that there is no distortion of the rubber and the rubber adjacent to the tube is kept at a sufficiently low temperature to prevent weakening the rubber.

The apparatus for practicing the method and forming the subject matter of the invention is illustrated in the accompanying drawings as follows:—

Fig. 1 shows a section on the line 1—1 in Fig. 2.

Fig. 2 a section on the line 2—2 in Fig. 1.

Fig. 3 a side elevation, partly in section.

Fig. 4 an end elevation.

Fig. 5 a top view of the cover removed.

Fig. 6 a section on the line 6—6 in Fig. 5.

1 marks the mold which is simply in the form of a cylinder. This is ordinarily mounted on the base 2. A steam jacket 3 extends around a central zone of the mold being supplied with steam from a pipe 4 and water jackets 5 surround zones of the mold at each side of the steam jacket 3, water being supplied to the jackets 5 by way of pipes 6.

An opening 7 extends longitudinally through the top of the mold and a cover 8 is removably fitted into this opening to close the mold. The cover is retained by a cross bar 9. The eye bolts 10 are secured to the mold by pins 11 and extend through slots 12 in the cross bar. Nuts 13 arranged at the ends of the eye bolt clamp the cover in place. The central part of the cover which is subjected to steam heat is made very narrow as indicated in dotted lines at 14 of just sufficient width to withdraw the finished tube. The water-cooled ends for convenience are preferably made slightly wider.

It is desirable to prevent longitudinal extension of the tube during the vulcanizing action and I prefer to also close off the parts of the tube outside of the mold. Cross bars 15 extend across the lower portions of the ends of the mold. A removable bar 16 is arranged above the bar 15, the bar 16 being hinged on a pin 17. It is provided with a slot 16ª which swings over a pin 18. The plate is clamped against the end of the mold by a nut 19. It will readily be seen that after the tube ends are in place the plate 16 is forced down on the rubber tube making a closure at this point so that the portion of the tube within the mold may be inflated without inflating the entire tube. The walls of the tube are brought together in a plane approximately at the axis of the tube so that the expanded portions of the tube are put under equal strain. The mold is supplied with a stem opening 20 for this purpose. In molding a tube the two ends of the tube are supplied with vulcanizing material, one end being drawn into the longitudinal slot, the tube ends overlapped and the ends drawn into the mold, the mold closed and the ends sealed and the tube inflated. The cementing quality of the vulcanizing material is sufficient to seal the tube ends so that the joint receives the pressure of the fluid. The vulcanizing heat of the steam jacket then vulcanizes the tube, the parts adjacent to this being cooled and consequently there is a prevention of deterioration except in that part of the tube which overlaps at the joint. This overlapping sufficiently strengthens this part of the rubber which is thus weakened to prevent the undue expansion of the tube at or adjacent to the joint as commonly occurs with tubes which have been closed by vulcanization.

What I claim as new is:—

1. In a tube end vulcanizing device, the combination of a mold having a longitudinal opening for removing the tube; a cover for the opening; means for heating an intermediate zone; and means for cooling zones adjacent to the heated zone, the longitudinal opening being narrower at the heated zone than at the cooled zones.

2. In a tube end vulcanizing device, the combination of a mold; means for heating an intermediate zone of the mold; means for cooling portions adjacent to the heated zone; and means for enclosing an inserted tube at the ends of the mold, said mold having a longitudinal opening for the withdrawal of the tube; and a cover for the longitudinal opening, said cover having a valve stem opening.

In testimony whereof I have hereunto set my hand.

JOSEPH G. MOOMY.